(12) United States Patent
Kiyomiya et al.

(10) Patent No.: US 6,436,200 B1
(45) Date of Patent: Aug. 20, 2002

(54) METHOD FOR PREPARING MAGNETIC HEAD

(75) Inventors: Teruo Kiyomiya; Yuji Uehara, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/533,542

(22) Filed: Mar. 23, 2000

(30) Foreign Application Priority Data

Sep. 1, 1999 (JP) .............................. 11-247702

(51) Int. Cl.$^7$ .......................... H01F 10/32; G11B 5/127

(52) U.S. Cl. .................... 148/121; 29/603.08
(58) Field of Search ................. 148/121; 29/603.08

(56) References Cited

U.S. PATENT DOCUMENTS 5,331,728 A * 7/1994 Argyle ..................... 29/603

FOREIGN PATENT DOCUMENTS

| JP | 3141007 | 6/1991 |
| JP | 10003611 | 1/1998 |

* cited by examiner

*Primary Examiner*—John Sheehan
(74) *Attorney, Agent, or Firm*—Greer, Burns & Crain, Ltd.

(57) ABSTRACT

There is disclosed a method for preparing a magnetic head having a high-speed magnetic recording ability. A resist insulating layer 70 is formed on a coil, a magnetic pole layer 41 is formed on the resist insulating layer 70, and a laminate 10 including the resist insulating layer 70 and the magnetic pole layer 41 is heated so that the resist insulating layer 70 is allowed to shrink.

8 Claims, 8 Drawing Sheets

METHOD FOR PREPARING MAGNETIC HEAD

BACKGROUND OF THE INVENTION (i) Field of the Invention

The present invention relates to a method for preparing a recording magnetic head for use in a magnetic disc device.

(ii) Description of the Related Art

In recent years, the capacity of a magnetic disc device for use as the external storage device of a computer is being enlarged, and with the enlargement of the capacity, the data recording density of the recording medium of the magnetic disc device is enhanced, and the data transfer speed between the recording medium and a recording magnetic head is increased. Therefore, a magnetic head is demanded which can realize a high-speed magnetic recording.

The magnetic head is usually prepared using a so-called thin film technique, and the magnetic pole of the magnetic head is formed by plating a film of nickel iron (NiFe) alloy by an electric plating process or the like. It is known that a tensile stress is generated as an internal stress in the NiFe alloy film formed by the plating process. Therefore, with the intention of avoiding the disturbance of a magnetic domain structure by the internal stress, it is general to use an alloy of 80% of Ni and 20% of Fe (Ni80Fe20 alloy) as the NiFe alloy to form the magnetic pole, which has only a small magnetostriction and which is not easily susceptible to an influence of internal stress.

For the magnetic head with the magnetic pole formed of the Ni80Fe20 alloy, however, the saturation magnetic flux density of Ni80Fe20 alloy is as small as about 1 T and the specific resistance is also as small as about 20 $\mu\Omega$cm. Therefore, if the recording frequency is large, the recording ability becomes insufficient because of a drop in recording magnetic field intensity caused by the loss of eddy current in the magnetic pole.

Therefore, it is proposed to use the NiFe alloy which has a large specific resistance as well as a large saturation magnetic flux density (high Bs-NiFe alloy), and has a ratio of Ni of 35% to 70%. This high Bs-NiFe alloy is expected to contribute to a high-speed magnetic recording ability because its specific resistance is as large as 20 to 70 $\mu\Omega$cm, and the saturation magnetic flux density is also as large as 1.3 to 1.6 T.

However, since such high Bs-NiFe material provides a positive magnetostriction, and its magnetostriction constant is 1 to $3\times10^{-5}$, and larger than that of the Ni80Fe20 alloy, the tensile stress remaining inside the plated film tends to deteriorate the magnetic domain structure of the magnetic pole from a closure magnetic domain which is an essentially desirable magnetic domain structure, to the magnetic domain structure to be avoided which is called "longitudinal magnetic domain". This deterioration of the magnetic domain structure results in a lowered recording ability in a high-frequency area, and the problem is that the high potential inherent in the high Bs-NiFe material cannot be derived.

SUMMARY OF THE INVENTION

The present invention has been developed in consideration of the above-described circumstances, and an object of the present invention is to provide a method for preparing a magnetic head in which the magnetic head having a high-speed magnetic recording ability can be prepared.

To attain the above-described object, according to the present invention, there is provided a method for preparing a magnetic head comprising:

a coil forming step of forming a conductive layer constituting a coil;

a heat-shrinkable layer forming step of laminating a heat-shrinkable layer consisting of a heat-shrinkable substance after the conductive layer in laminating order;

a magnetic pole layer forming step of laminating a magnetic pole layer consisting of a magnetic body indicating a positive magnetostriction after the heat-shrinkable layer in the laminating order; and a heat treatment step of heating a laminate constituted by laminating a plurality of layers including the heat-shrinkable layer and the magnetic pole layer to shrink the heat-shrinkable layer.

Here, another magnetic pole layer consisting of another magnetic body other than the magnetic body constituting the above-described magnetic pole layer may be laminated on the above-described magnetic pole layer. Moreover, the magnetic body constituting the above-described magnetic pole layer may be any magnetic body indicating the positive magnetostriction, such as magnetic bodies of an NiFe alloy, an NiFeMo alloy and other alloys obtained by adding various elements to a base of NiFe alloy. Furthermore, examples of the method of forming the magnetic pole layer include an electric plating process, an electroless plating process, a sputtering process and a deposition process.

Additionally, the above-described conductive layer may constitute a single layer coil, or a multilayered coil.

According to the method for preparing the magnetic head of the present invention, since the heat-shrinkable layer shrinks by the heat treatment step, the internal stress of the magnetic pole layer forms a compression stress, and the magnetic domain structure of the magnetic pole layer is improved. As a result, the magnetic head which can realize a high-speed magnetic recording is prepared.

Moreover, since the heat treatment step in the method for preparing the magnetic head of the present invention requires no external magnetic field and the magnetic domain structure is improved even by the heat treatment with no magnetic field, the method for preparing the magnetic head of the present invention can be applied to MR head in which a spin valve is used as a magnetoresistive (MR) effect film.

In the method for preparing the magnetic head of the present invention, the magnetic body constituting the above-described magnetic pole layer is preferably an alloy of nickel and iron in which the ratio of nickel is in a range of 35% to 70% by weight.

Since the NiFe alloy with the ratio of nickel in the range of 35% to 70% by weight indicates a positive magnetostriction and a magnetostriction constant of 1 to $3\times10^{-5}$, the magnetic domain structure of the magnetic pole layer of the NiFe alloy is securely improved by the heat treatment step.

Moreover, in the method for preparing the magnetic head of the present invention using such alloy, the heat treatment step preferably comprises shrinking the thickness of the heat-shrinkable layer by 1% or more.

More preferably, the heat treatment step comprises shrinking the thickness of the heat-shrinkable layer by 2% or more.

By shrinking the thickness of the heat-shrinkable layer by 1% or more in the heat treatment step, the magnetic domain structure of the magnetic pole layer can securely be improved. Moreover, the anisotropic magnetic field of the magnetic pole layer can be set to be larger than 4 Oe by shrinking the thickness of the heat-shrinkable layer by 2% or more, and natural resonance between the magnetic field and spontaneous magnetization can be prevented from occurring during high-speed magnetic recording.

Moreover, in the method for preparing the magnetic head of the present invention, the above-described heat-shrinkable layer forming step preferably comprises forming an insulating layer of a heat-shrinkable insulating body to cover the conductive layer.

Furthermore, it is preferably that the insulating body is a thermosetting resist, and the above-described heat-shrinkable layer forming step comprises applying the resist to the conductive layer, and heating the applied resist at a predetermined temperature to form a resist insulating layer.

The magnetic head has an insulating layer to cover the conductive layer constituting the coil, and the magnetic pole layer is laminated on the insulating layer. By forming the insulating layer as the heat-shrinkable layer, a complicated magnetic head structure can be avoided. Moreover, the insulating layer to cover the conductive layer is generally formed of the resist, and it is known that the thermosetting resist indicates heat-shrinkable properties. Therefore, the resist insulating layer can be utilized as the heat-shrinkable layer, and the method for preparing the magnetic head of the present invention can easily be realized.

In case that such resist insulating layer is utilized as the heat-shrinkable layer, the above-described heat-shrinkable layer forming step preferably comprises heating the resist at a temperature in a range of 180° C. to 300° C.

Moreover, the heat treatment step preferably comprises heating the laminate at a temperature in a range of 200° C. to 350° C.

In case that the resist is heated at a temperature less than 180° C. in the heat-shrinkable layer forming step, the resist strength becomes insufficient, and there is a possibility that a crack is generated in a process of preparing a slider or the like. On the other hand, in case that the resist is heated at a temperature higher than 300° C. in the heat-shrinkable layer forming step, the shrinkage of the resist insulating layer becomes insufficient in the heat treatment step.

Moreover, in case that the laminate is heated at a temperature less than 200° C. in the heat treatment step, the shrinkage of the resist insulating layer becomes insufficient. In case that the laminate is heated at a temperature higher than 350° C., there is a high possibility that the magnetic head is damaged.

According to the method for preparing the magnetic head of the present invention, the magnetic head having a high-speed magnetic recording ability can be prepared.

DETAILED DESCRIPTION OF THE PREFERRED EMBODIMENTS

A mode of practicing the present invention will be described hereinafter.

Figure 1:
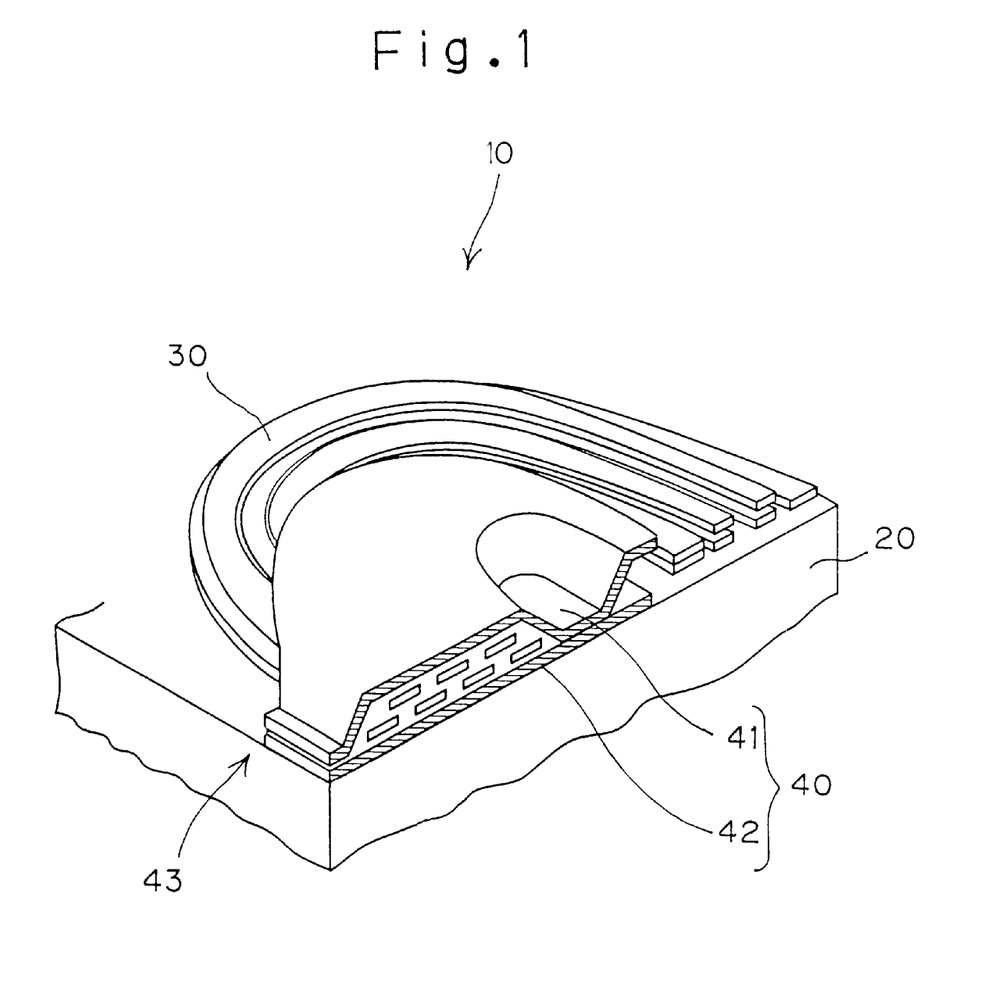
FIG. 1 is a diagram showing one example of a magnetic head which is prepared by applying a method for preparing a magnetic head of the present invention.

FIG. 1 is a diagram showing one example of a magnetic head prepared by applying the method for preparing the magnetic head of the present invention.

FIG. 1 shows a structure of an inductive head 10. Moreover, MR head is constituted by combining a recording head equivalent to the inductive head 10 shown in FIG. 1, and a regenerative head utilizing a magnetoresistive effect in which the electric resistance of a magnetic thin film changes in accordance with an external magnetic field. Furthermore, the method for preparing the magnetic head of the present invention is applied to both the preparation of the inductive head and the preparation of the recording head of MR head. The structure of the inductive head will be described hereinafter.

The inductive head 10 is formed on a substrate 20 by a thin-film technique using the thin film formation and fine processing by photoetching, and is provided with a flat spiral coil 30 for generating a recording magnetic field, and a magnetic pole 40 for guiding the magnetic flux of the recording magnetic field. Here, two layers of flat spiral coils 30 are shown, and the magnetic pole 40 is constituted of an upper magnetic pole 41 and a lower magnetic pole 42. By passing electric current through the coil 30, the recording magnetic field is generated, and the magnetic flux of the generated recording magnetic field is guided by the magnetic pole 40 to leak to the outside via a gap 43 between the upper magnetic pole 41 and the lower magnetic pole 42. Subsequently, information is recorded on the magnetic recording medium by the leaked magnetic flux. The width of the tip end of the magnetic pole 40 corresponds to a track width, and the track width is narrowed with the enhancement of the face recording density of a hard disc device.

A procedure of preparing the inductive head 10 according to one embodiment of the method for preparing the magnetic head of the present invention will next be described.

FIGS. 2 to 8 are explanatory views of the preparing procedure of the inductive head.

Figure 2:
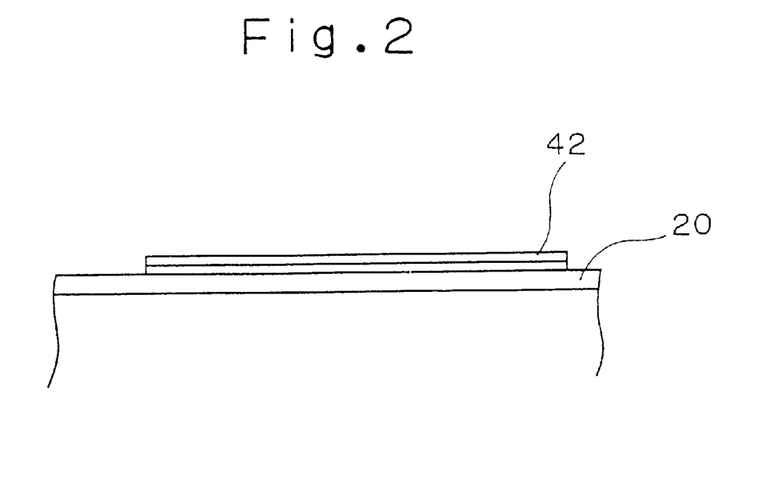
FIG. 2 is a diagram showing a first procedure of preparing an inductive head.

First, the lower magnetic pole layer 42 is formed on the substrate 20 (FIG. 2). Generally, $Al_2O_3$—TiC substrate suitable as a slider material is used as the substrate 20.

Figure 3:
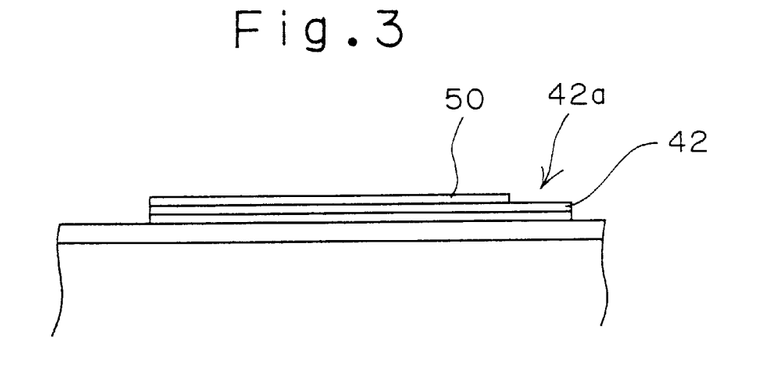
FIG. 3 is a diagram showing a second procedure of preparing the inductive head.

Subsequently, a nonmagnetic film 50 of $Al_2O_3$ or the like is formed on the lower magnetic pole layer 42 by a thickness corresponding to a gap length by a sputtering process or the like (FIG. 3). At this time, on the surface of the lower magnetic pole 42, the nonmagnetic film 50 is not formed on a portion 42a which contacts an upper magnetic pole layer formed later.

Figure 4:
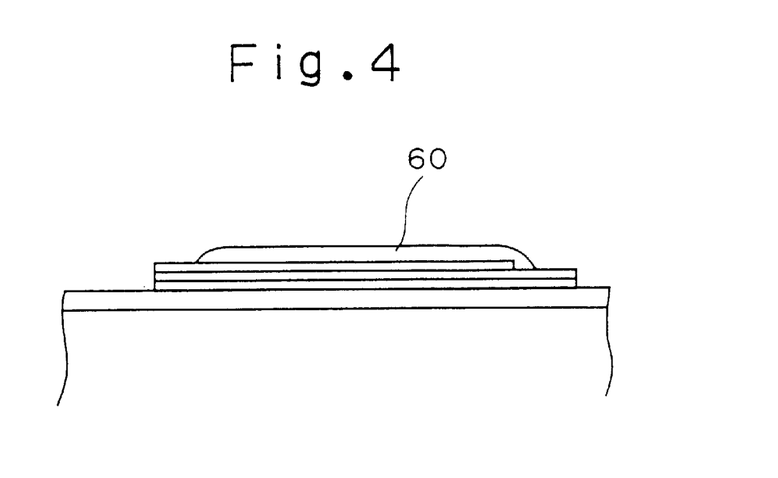
FIG. 4 is a diagram showing a third procedure of preparing the inductive head.

Subsequently, a photoresist 60 is applied to a coil forming area, heated and cured (FIG. 4). The cured photoresist 60 itself is used as the insulating layer.

Figure 5:
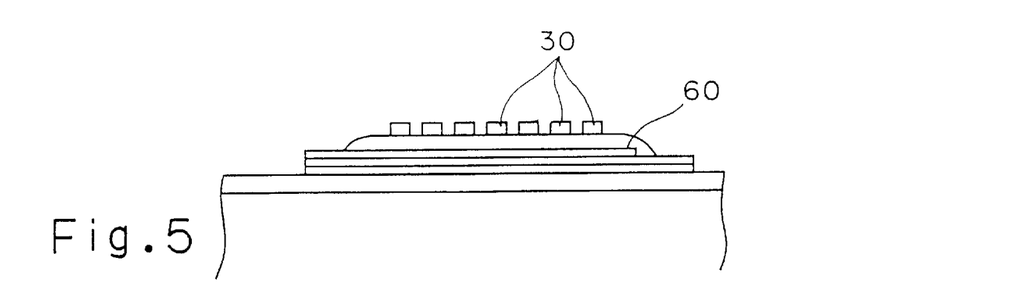
FIG. 5 is a diagram showing a fourth procedure of preparing the inductive head.
Figure 6:
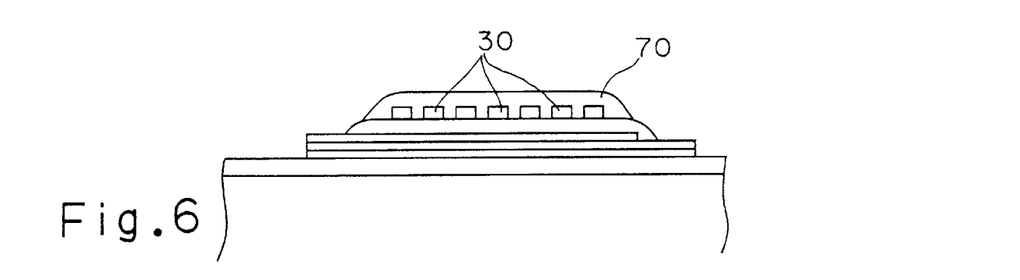
FIG. 6 is a diagram showing a fifth procedure of preparing the inductive head.
Figure 7:
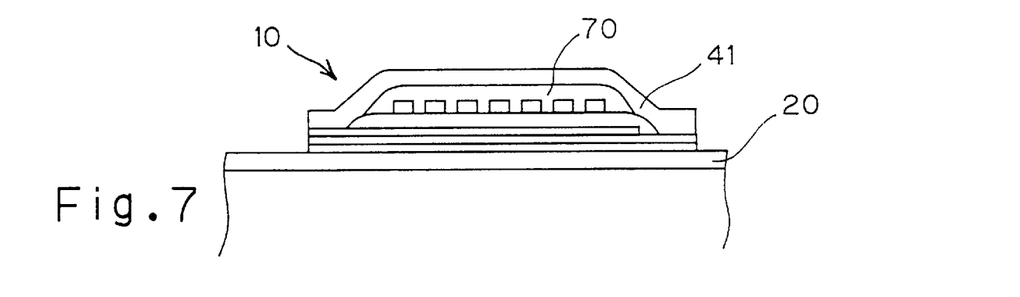
FIG. 7 is a diagram showing a sixth procedure of preparing the inductive head.

The copper layer (conductive layer) 30 constituting the coil is laminated on the insulating layer 60 (FIG. 5). Subsequently, the photoresist is again applied, heated and cured on the conductive layer 30 to form an insulating layer 70 (FIG. 6), and the upper magnetic pole layer 41 is formed on the insulating layer 70 (FIG. 7). Thereby, the inductive head element 10 corresponding to the laminate referred to in the present invention is prepared. Subsequently, the inductive head element 10 is heated together with the substrate 20 to shrink the insulating layer 70 so that the magnetic domain structure of the upper magnetic pole layer 41 is improved. When even the resist insulating layer 70 once cured is subjected to the heat treatment again, the resist shrinks. Therefore, the compression stress is generated in the upper magnetic pole layer 41 by this shrinkage, and the magnetic domain structure of the upper magnetic pole layer 41 can be improved to provide a closure magnetic domain.

Figure 8:
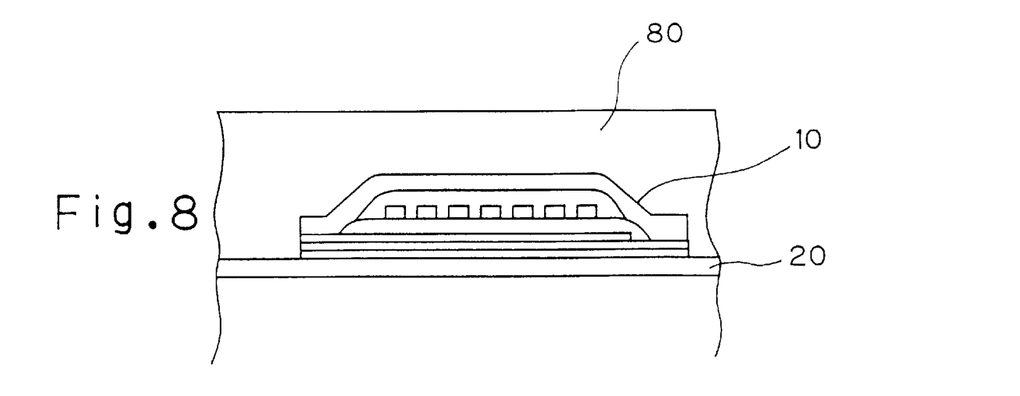
FIG. 8 is a diagram showing a seventh procedure of preparing the inductive head.

Thereafter, a protective film 80 of $Al_2O_3$ is formed on the inductive head element 10 to protect the head element 10 from the impact or the like during the slider processing of the substrate 20. Furthermore, the slider processing comprising cutting the substrate 20, adjusting a gap depth, grinding, and polishing is performed, and the magnetic head is finished (FIG. 8). Thereby, the magnetic head having the high-speed magnetic recording ability is prepared.

Embodiments of the present invention will next be described.

In a first embodiment, a striped resist insulating layer, and a striped plated film orthogonal to the resist insulating layer were formed as the models of the insulating layer and magnetic pole layer of the magnetic head.

Figure 9:
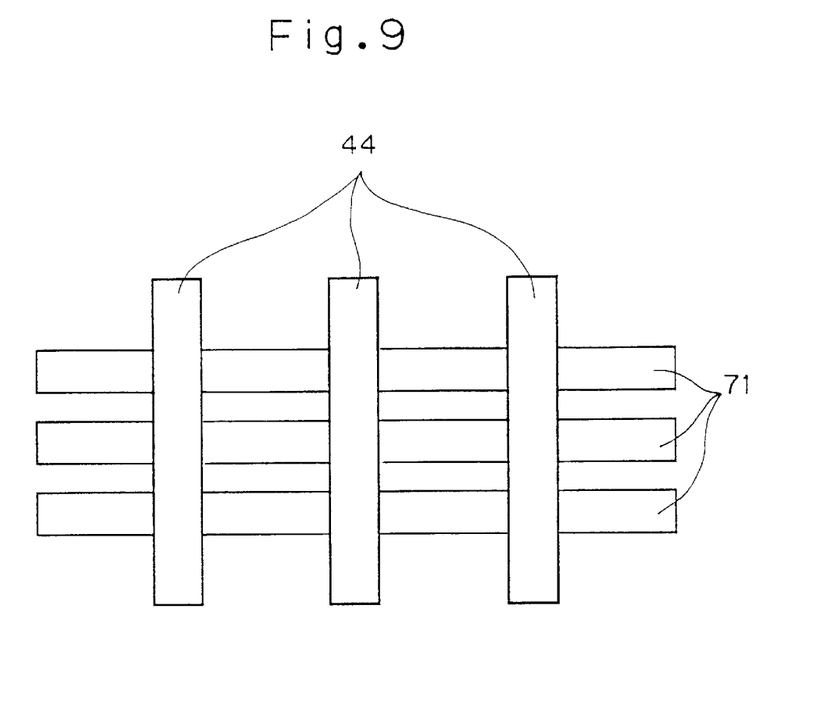
FIG. 9 is a front view of a striped resist insulating layer and plated film.
Figure 10:
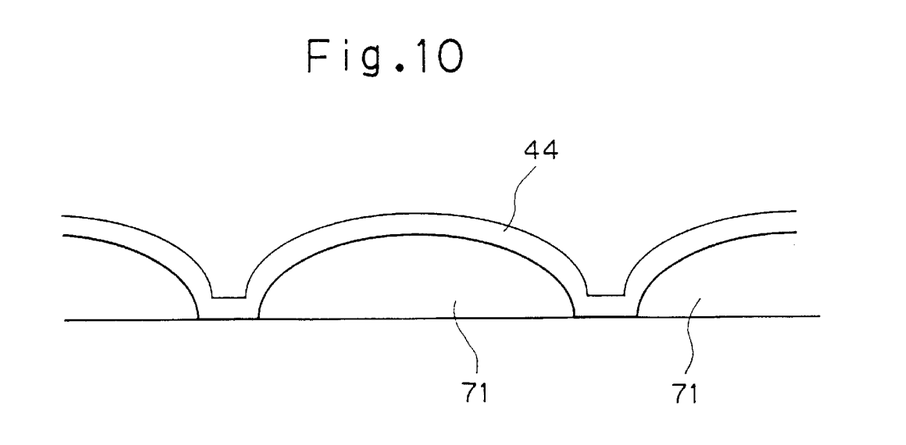
FIG. 10 is a side view of the striped resist insulating layer and plated film.

FIG. 9 is a front view of the striped resist insulating layer and plated film, and FIG. 10 is a side view thereof.

First a striped resist insulating layer 71 with a width of 100 $\mu$m and a thickness of about 10 $\mu$m was formed on the substrate. The formed resist insulating layer 71 has a lens-shaped cross section. The resist insulating layer 71 was prepared using four types of samples shown in the following Table 1.

TABLE 1

| Sample Name | Resist Type | Curing Condition |
| --- | --- | --- |
| Sample A | AZP4620 × 1500 rpm | 275° C. nitrogen (10 L/m) 3 Hr |
| Sample B | AZP4620 × 1500 rpm | 230° C. atmosphere 1 Hr + 230° C. nitrogen (10 L/m) 1 Hr |
| Sample C | AZP4620 × 1500 rpm | 250° C. nitrogen (10 L/m) 1 Hr |
| Sample D | SIPR-9354-6.0 × 1500 rpm | 200° C. nitrogen (10 L/m) 1 Hr |

In Table 1, sample names are shown in the left column, the resist types and the number of revolutions of the substrate during the resist film forming are shown in the middle column, and resist curing conditions are shown in the right column. For example, sample B was prepared by applying the resist of type "AZP4620" onto the substrate, rotating the substrate 1500 times per minute to form a film, performing exposure in a striped state to develop an image, performing heating in the atmosphere of 230° C. for one hour, and further heating in a nitrogen atmosphere of 230° C. for one hour while passing nitrogen by ten liters per minute.

Turning back to FIG. 9, the description will be continued.

On each of the resist insulating layers 71 of four types of samples A, B, C, D shown in Table 1, the NiFe alloy with 50% of Ni and 50% of Fe was plated in a magnetic field of about 500 Oe over a length of 8 mm in a striped manner so that the alloy was orthogonal to the resist insulating layer 71 and a plated film 44 was formed. The thickness of the plated film 44 was about 3 $\mu$m, and three widths of plated films 44 of 30 $\mu$m, 50 $\mu$m, 100 $\mu$m were formed. The magnetic domain structure of the plated film 44 immediately after the formation was observed by Vitter process.

Moreover, the resist insulating layer 71 and the plated film 44 were heated under predetermined conditions, and the magnetic domain structure of the heated plated film 44 was observed by the Vitter process.

FIGS. 11A to 11F are diagrams showing the patterns of the observed magnetic domain structure.

In FIGS. 11A to 11F, the direction of arrow M corresponds to the direction of the recording magnetic field. Additionally, the direction of the applied magnetic field during the forming of the plated film 44 is orthogonal to the arrow M.

Figure 11:
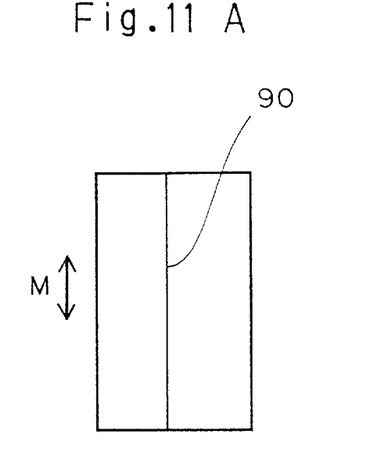
FIGS. 11A~11F are diagrams showing the patterns of an observed magnetic domain structure.

FIGS. 11A and 11B show the magnetic domain structure called "longitudinal magnetic domain" in which a magnetic wall 90 runs in the direction of the recording magnetic field. In this magnetic domain structure, since the magnetization reverse speed is slow, the magnetic pole having this magnetic domain structure is low in high-speed magnetic recording ability.

FIGS. 11C and 11D show the magnetic domain structure in which the magnetic wall 90 is short and the magnetic domain is tangled. This magnetic domain structure is better than the "longitudinal" magnetic domain structure, and the high-speed magnetic recording ability of the magnetic pole having the magnetic domain structure as shown in FIGS. 11C and 11D is higher than the ability of the magnetic pole having the "longitudinal" magnetic domain structure.

FIGS. 11E and 11F show the magnetic domain structure in which the magnetic wall 90 is long in the direction orthogonal to the recording magnetic field direction, and particularly the magnetic domain structure shown in FIG. 11F is referred to as "closure magnetic domain". In the magnetic domain structure as shown in FIGS. 11E and 11F, since the magnetization rotation can be performed, the magnetization reverse speed is fast. Therefore, the magnetic pole having the magnetic domain structure as shown in FIGS. 11E and 11F possesses the high-speed magnetic recording ability.

The following Table 2 shows the observation results of the magnetic domain structures of the striped plated films 44 shown in FIGS. 9 and 10.

TABLE 2

| | Stripe Width | After Plating | 200° C. Vac. | 250° C. Vac. | 275° C. Vac. |
| --- | --- | --- | --- | --- | --- |
| Sample A | 30 $\mu$m | x | x | x | x |
| | 50 $\mu$m | x | x | x | x |
| | 100 $\mu$m | x | (x) | x | o |
| Sample B | 30 $\mu$m | x | x | x | Δ |
| | 50 $\mu$m | x | x | x | o |
| | 100 $\mu$m | x | (x) | (x) | o |

TABLE 2-continued

|  | Stripe Width | After Plating | 200° C. Vac. | 250° C. Vac. | 275° C. Vac. |
|---|---|---|---|---|---|
| Sample C | 30 μm | x | x | o | o |
|  | 50 μm | x | x | o | o |
|  | 100 μm | x | (x) | o | o |
| Sample D | 30 μm | x | Δ | o | o |
|  | 50 μm | x | Δ | o | o |
|  | 100 μm | (x) | (x) | o | o |

The left end column of Table 2 shows the sample name of the resist insulating layer 71, and the "stripe width" column shows the width of the striped plated film 44. Moreover, Table 2 shows the observation results of the magnetic domain structure with respect to the plated film 44 with each stripe width formed on each sample of the resist insulating layer 71 immediately after plating, after heating in vacuum with no magnetic field at 200° C. for one hour, further after heating at 250° C. for one hour, and still further after heating at 275° C. for one hour. In Table 2 marks "x", "(x)", "Δ", "o" represent the observation results of the magnetic domain structure, and the mark "x" indicates that the magnetic domain structure shown in FIG. 11A was observed. Similarly, the marks "(x)", "Δ", "o" indicate that the magnetic domain structures shown in FIGS. 11B, 11C and 11D, 11E and 11F were observed.

It has been found from the observation results of Table 2 that each magnetic domain structure immediately after the plating is "longitudinal magnetic domain", the improvement tendency of the magnetic domain structure appears in some of the samples after the heat treatment in 200° C., and a desirable magnetic domain structure is realized in most of the samples after the heat treatment in 275° C.

As described above, it has been found that the magnetic domain structure is sufficiently improved by the heating treatment after the plated film forming.

A relation between the film thickness change of the resist insulating layer 71 and the improvement of the magnetic domain structure will next be described.

Figure 12:
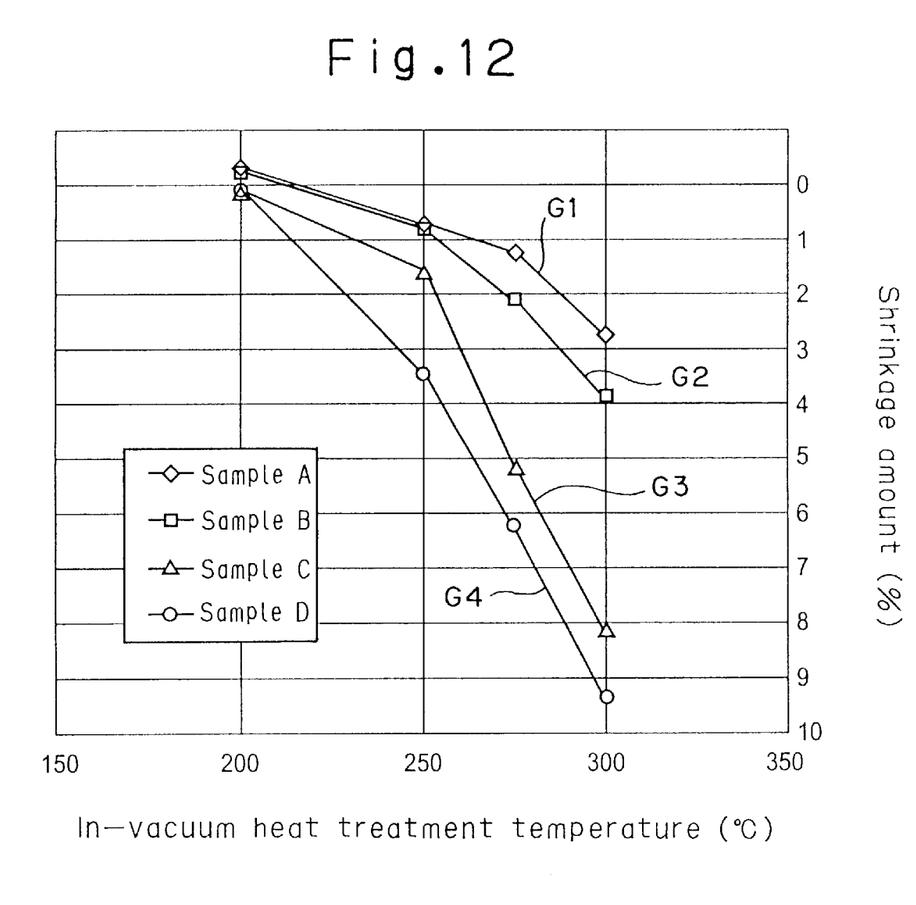
FIG. 12 is a graph showing the film thickness change of the striped insulating layer.

FIG. 12 is a graph showing the film thickness change of the striped insulating layer.

The axis of ordinate of FIG. 12 shows the amount by which the film thickness of the insulating layer shrinks by the heat treatment while the film thickness of the insulating layer immediately after formation is set to 100%, and the axis of abscissa shows the heat treatment temperature. Moreover, the film thickness change of the sample A is shown by a broken-line graph G1 with rhomboid marks attached thereto, and the film thickness changes of the samples B, C, D are shown by broken-line graphs G2, G3, G4 with square, triangle, and circle marks attached thereto.

The film thickness after the heat treatment in 200° C. was substantially unchanged from the film thickness during the insulating layer forming with respect to any of four types of samples A, B, C, D. Moreover, for the film thickness after the heat treatment in 300° C. as compared with the film thickness during the insulating layer forming, the sample A shrank by about 2.7%, the sample B shrank about 4%, the sample C shrank about 8%, and the sample D shrank about 9.2%.

Furthermore, the examination of the observation results shown in Table 2 together with the graph of FIG. 12 reveals that the film thickness of the sample A shrank by about 0.8% by the heat treatment of 250° C. without any improvement of the magnetic domain structure, and the film thickness shrank about 1.1% by the heat treatment of 275° C. with the observed improvement tendency of the magnetic domain structure. For the sample B, the film thickness shrank by about 0.8% in the heat treatment of 250° C. without any improvement of the magnetic domain structure, and the film thickness shrank about 2% in the heat treatment of 275° C. with the improvement of the magnetic domain structure. The samples C and D shrank in film thickness by about 1.5% and about 3.3% by the heat treatment of 250° C. and the magnetic domain structures were improved.

It has been found from the examination result that when the film thickness of the insulating layer shrinks by 1% or more, the magnetic domain structure of the plated film is improved.

Additionally, it is known in case that the anisotropic magnetic field of the plated film is small, the natural resonance occurs between the spontaneous magnetization and the recording magnetic field and the high-speed magnetic recording ability is lowered. Here, the check of the anisotropic magnetic field of the plated film on each of the above-described samples has revealed that in case that the film thickness shrinks by 2% or more, the anisotropic magnetic field of the plated film reaches 4 Oe or more so that the natural resonance is prevented.

The first embodiment has been described above, and a second embodiment will be described hereinafter.

In the second embodiment, the MR head using the spin valve as MR film was prepared using the method for preparing the magnetic head of the present invention.

The following Table 3 shows the characteristics of the MR head prepared in the second embodiment.

TABLE 3

| Upper magnetic pole | Ni40Fe60 single layer 3.7 μm |
|---|---|
| Lower magnetic pole | Ni50Fe50 single layer 3.0 μm |
| Yoke length | 56 μm |
| Gap length | 0.3 μm |
| Track width | 2.7 μm |
| Coil | 10T (single layer) |

Here, the yoke length indicates the distance by which the upper magnetic pole rides over the insulating layer, and the gap length indicates the distance by which the upper magnetic pole is apart from the lower magnetic pole in the tip end of the magnetic pole. The coil of the MR head prepared in the second embodiment is a single-layer spiral coil, and the number of coil windings is ten.

After the MR head element characterized as shown in Table 3 was formed on a wafer, the wafer was subjected to the heat treatment of 200° C. for one hour in vacuum with no magnetic field. Moreover, a wafer with no heat treatment applied thereto was prepared as a comparative example. Subsequently, the magnetic domain structures of the upper magnetic poles of the MR heads prepared in the second embodiment and the comparative example were observed by the Vitter process.

Figure 13:
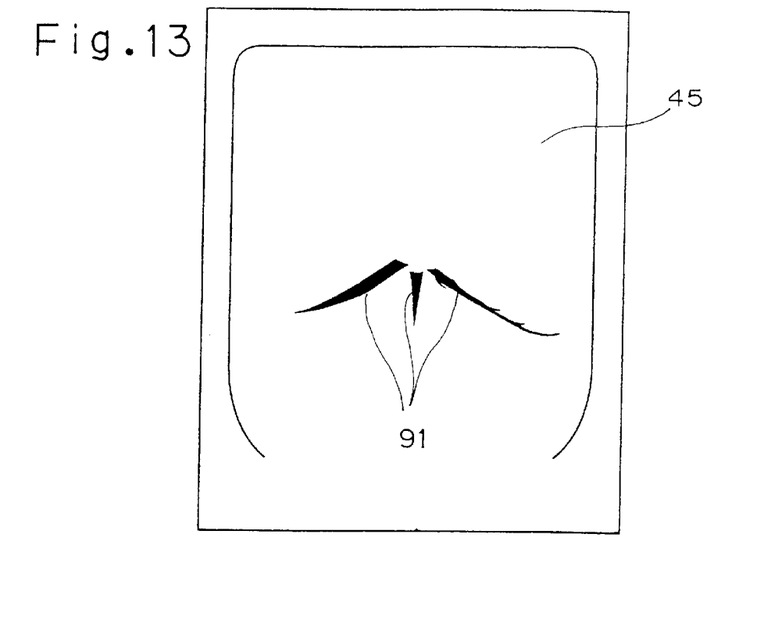
FIG. 13 is a diagram showing the observation result of the magnetic domain structure of the upper magnetic pole of MR head prepared in a comparative example.
Figure 14:
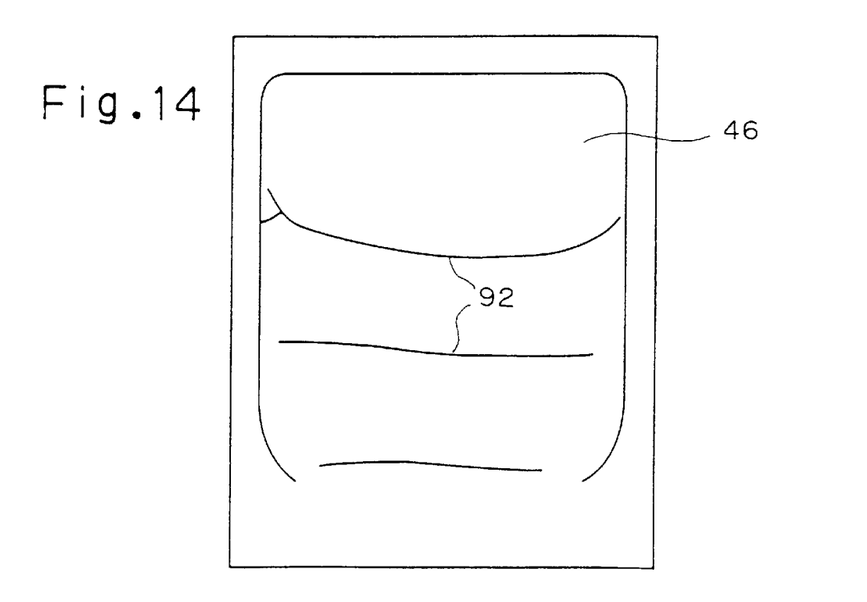
FIG. 14 is a diagram showing the observation result of the magnetic domain structure of the upper magnetic pole of MR head prepared in a second embodiment.

FIGS. 13 and 14 are diagrams showing the observation results of the magnetic domain structure of the upper magnetic pole of the MR head, FIG. 13 shows the observation result of the MR head prepared in the comparative example, and FIG. 14 shows the observation result of the MR head prepared in the second embodiment. Moreover, in FIGS. 13 and 14 the vertical direction corresponds to the direction of the recording magnetic field.

As shown in FIG. 13, an arrow-shaped magnetic wall 91 directed in the direction of the recording magnetic field was observed in a magnetic pole 45 of the MR head prepared in the comparative example, and it has been found that the magnetic domain structure of the MR head prepared in the comparative example is "longitudinal magnetic domain".

Moreover, as shown in FIG. 14, a magnetic wall 92 running in the direction orthogonal to the recording magnetic field was observed in a magnetic pole 46 of the MR head prepared in the second embodiment, and it has been found that the magnetic domain structure of the MR head prepared in the second embodiment is improved to provide the closure magnetic domain.

The MR head prepared as described above was used to record data with a recording current of 30 mA on a circumference of 36.8 mm from the center on the disc-shaped magnetic recording medium rotating at 7200 rpm and having a coercive field strength of 2200 Oe and Br·t (product of residual magnetization and film thickness) of 80 G$\mu$m.

Subsequently, the recording ability was measured by using a detecting current of 4 mA to detect the recorded data.

Figure 15:
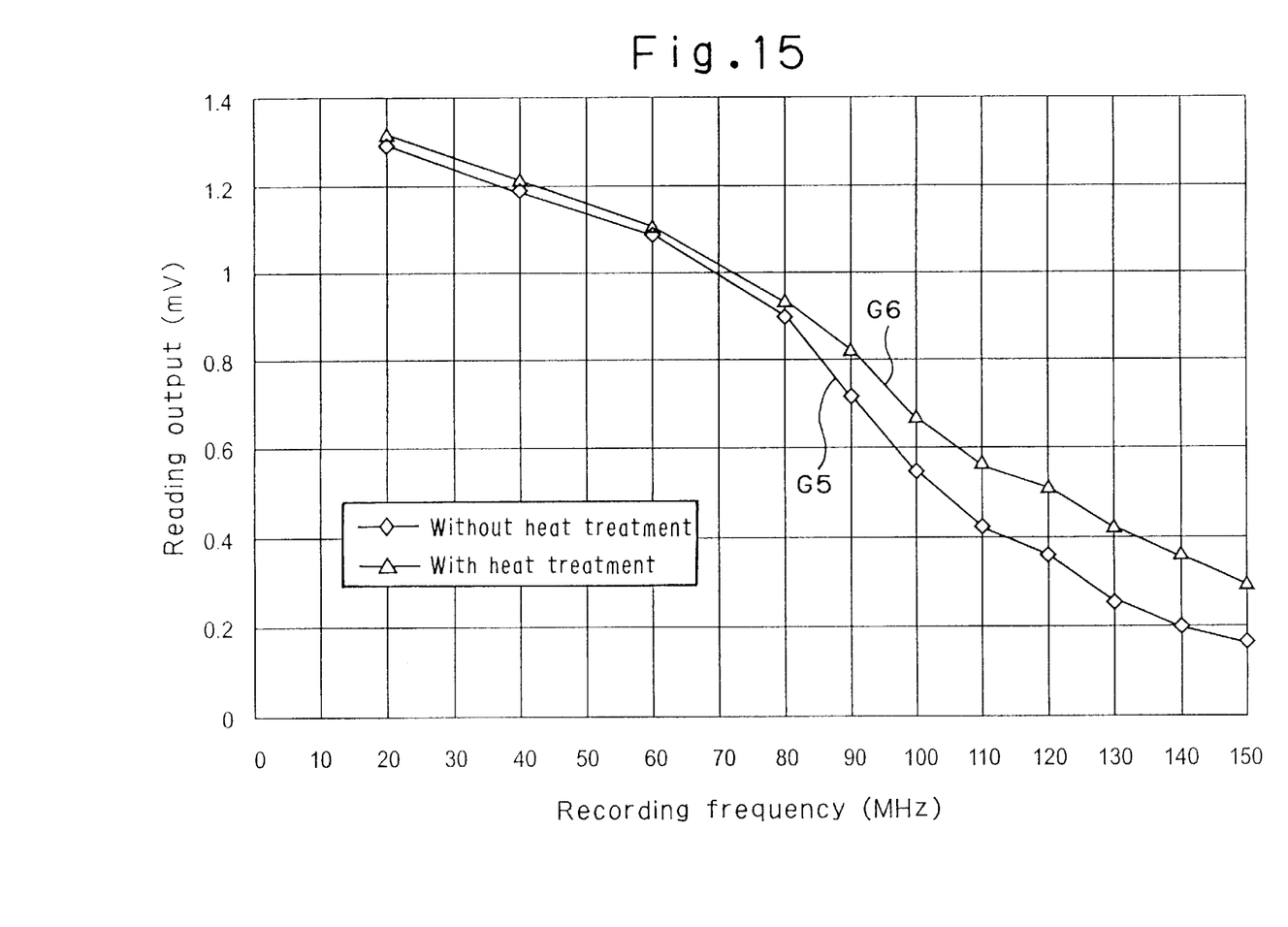
FIG. 15 is a graph showing the measurement result of a recording ability.

FIG. 15 is a graph showing the observation result of the recording ability.

The axis of abscissa of FIG. 15 shows the magnetic recording frequency, and the axis of ordinate shows the reading output by the spin valve head.

A graph G5 with rhomboid marks attached thereto shows the recording ability of the MR head prepared in the comparative example with no heat treatment, and a graph G6 with triangle marks attached thereto shows the recording ability of the MR head prepared in the second embodiment with the heat treatment. It is found from these graphs G5, G6 that the recording ability of the MR head with the heat treatment is superior to the recording ability of the MR head with no heat treatment particularly in a high-frequency area.

What is claimed is:

1. A method for preparing a magnetic head comprising:

a coil forming step of forming a conductive layer constituting a coil;

a heat-shrinkable layer forming step of laminating a heat-shrinkable layer of a heat-shrinkable substance at least after said conductive layer is formed;

a magnetic pole layer forming step of laminating a magnetic pole layer of a magnetic body with a positive magnetostriction constant at least after said heat-shrinkable layer is formed; and a heat treatment step of heating a laminate that at least includes said heat-shrinkable layer and said magnetic pole layer to shrink said heat-shrinkable layer.

2. The method for preparing the magnetic head according to claim 1 wherein the magnetic body constituting said magnetic pole layer is an alloy of nickel and iron in which a ratio of nickel is in a range of 35% to 70% by weight.

3. The method for preparing the magnetic head according to claim 1 wherein said heat treatment step comprises shrinking the thickness of said heat-shrinkable layer by 1% or more.

4. The method for preparing the magnetic head according to claim 1 wherein said heat treatment step comprises shrinking the thickness of said heat-shrinkable layer by 2% or more.

5. The method for preparing the magnetic head according to claim 1 wherein said heat-shrinkable layer forming step comprises forming an insulating layer of a heat-shrinkable insulating body to cover the conductive layer.

6. The method for preparing the magnetic head according to claim 1, wherein said heat-shrinkable layer forming step comprises the steps of:

applying a thermosetting resist to said conductive layer; and heating said applied resist at a predetermined temperature to form a resist insulating layer as said heat-shrinkable layer.

7. The method for preparing the magnetic head according to claim 6 wherein said heat-shrinkable layer forming step comprises heating the resist at a temperature in a range of 180° C. to 300° C.

8. The method for preparing the magnetic head according to claim 6 wherein said heat treatment step comprises heating the laminate at a temperature in a range of 200° C. to 350° C.

* * * * *